United States Patent [19]

Isobe et al.

[11] Patent Number: 4,618,336

[45] Date of Patent: Oct. 21, 1986

[54] BELT STRETCHING MECHANISM

[75] Inventors: Masahiro Isobe; Sumio Okazaki; Hideki Tanaka, all of Toyota, Japan

[73] Assignee: Toyota Jidosha Kabushiki Kaisha, Toyota, Japan

[21] Appl. No.: 707,234

[22] Filed: Mar. 1, 1985

[30] Foreign Application Priority Data

Mar. 2, 1984 [JP] Japan .............................. 59-029372

[51] Int. Cl.⁴ .............................................. F16H 7/14
[52] U.S. Cl. .................................... 474/133; 474/113; 474/114
[58] Field of Search ................ 474/101, 109, 113–115, 474/117, 126, 133

[56] References Cited

U.S. PATENT DOCUMENTS

| 2,184,541 | 12/1939 | Aikman | 474/114 X |
| 2,205,176 | 6/1940 | Sauer | 474/115 |
| 2,970,587 | 2/1961 | Estes | 474/113 |
| 3,922,927 | 12/1975 | Shiki et al. | 474/113 |
| 4,512,752 | 4/1985 | Brenneman | 474/114 |

Primary Examiner—James A. Leppink
Assistant Examiner—Thuy M. Bui
Attorney, Agent, or Firm—Cushman, Darby & Cushman

[57] ABSTRACT

A belt stretching mechanism to adjust the tension in a belt wound around pulleys by turning an adjust bolt and moving a slider which is fastened together with a stay to an adjust bar by means of a stay-fastening bolt, wherein the axis of the adjust bolt and the axis of the stay-fastening bolt are in the same plane, so that no bending moment acts on the adjust bolt and smooth tensioning of V-belt is ensured.

10 Claims, 12 Drawing Figures

BELT STRETCHING MECHANISM

BACKGROUND OF THE INVENTION

1. Field of the Invention

The present invention relates to a belt stretching mechanism. This invention may be employed to stretch the alternator V-belt in an internal combustion engine to a specified tension.

2. Description of the Prior Art

With the conventional alternator in an internal combustion engine, as illustrated in FIG. 10, the rotation of crank pulley 1 is transmitted to alternator pulley 3 through V-belt 5 wound around alternator pulley 3 of alternator 2 and water pump pulley 4. For alternator 2 and the water pump to function normally, V-belt 5 should be maintained at an adequate tension.

As enlarged in FIGS. 11 and 12, the top of conventional alternator 2 is supported by bracket 6. The bottom of alternator 2 is fastened by alternator stay 7, which extends downward from alternator 2. Stay 7 cooperates with slider 8 and adjust bar 9, which is fixed to the engine cylinder block, to holder alternator 2 in place. The tension of V-belt 5 is adjusted by loosing lock bolt 10 and therefore slider 8 which has been fastened together with alternator stay 7 to adjust bar 9 and changing the support angle of alternator 2 by rotating adjust bolt 11 which is screw-engaged with slider 8.

However, in this tension adjustment of V-belt 5, axis 12 of adjust bolt 11 is off-set from axis 13 of lock bolt 10. Therefore, when V-belt 5 is stretched by turning adjust bolt 11 in the tightening direction, the off-set causes a moment on slider 8 and a bending moment on adjust bolt 11. As a result, slider 8 inclines and the head of adjust bolt 11 inclines with respect to the bolt hole of adjust bar 9 through which adjust bolt 11 extends. The inclination of slider 8 and the head of adjust bolt 11 makes turning of adjust bolt 11 unsmooth and may cause such problems that V-belt 5 can not be stretched to a specified tension and that rigidity of adjust bolt 11 has to be increased to prevent bending of adjust bolt 11.

SUMMARY OF THE INVENTION

The object of the present invention is to provide a belt stretching mechanism, free from the above-mentioned drawbacks, which can automatically apply a specified tension to the belt without inclination of the slider and the adjust bolt when the adjust bolt is being tightened.

The belt stretching mechanism to adjust the tension of the belt around pulleys, the position of one of said pulleys being adjustable by moving a stay, according to the present invention comprises:

an adjust bar with a guide-hole;
an adjust bolt whose head contact-engages said adjust bar;
a slider through which said adjust bolt slidably extends;
a nut extending in the longitudinal direction of said adjust bolt and threaded onto said adjust bolt;
a slide cam formed at the end of said nut;
a spring interposed between said slider and said slide cam and urging said slider toward said head of said adjust bolt;
a spring plate extending from said slider parallel to the axis of said nut and being slidably engageble with said slide cam; and
a stay-fastening bolt extending through said guide hole of said adjust bar and fastening said stay together with said slider to said adjust bar, the axis of said stay-fastening bolt and the axis of said adjust bolt being located in the same plane.

In this arrangement of the belt stretching mechanism, when the nut is moved toward the head of the adjust bolt by turning the adjust bolt, the slider is driven toward the head of the adjust bolt via the spring. Thereby up to a certain extent of the belt tensioning, engagement of the slide cam with the spring plate prevents the nut from rotating and accordingly the driving is effective. However, when the belt tension increases, the slide cam comes to disengage from the spring plate and as a consequence the driving ceases to be effective. Thus the belt tension increases no more, thereby preventing an over-tension of the belt. Such a setting of the belt tension is automatically achieved through deflection of the spring, resulting in an increased efficiency.

In the above-mentioned belt tensioning mechanism, since the axis of the stay-fastening bolt and the axis of the adjust bolt are in the same plane, the load from the belt causes no moment on the slider and no bending moment on the adjust bolt. Therefore, the smooth turning of the adjust bolt is ensured and a specified tension of the belt will be easily obtained without any inclination of the slider and the head of the adjust bolt with respect to the bolt hole in the adjust bar. In addition, there is no need of increase in the rigidity of the adjust bar, because bending moment is not loaded on the adjust bar.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, wherein.

DETAILED DESCRIPTION OF THE PREFERRED EMBODIMENTS

Figure 1:
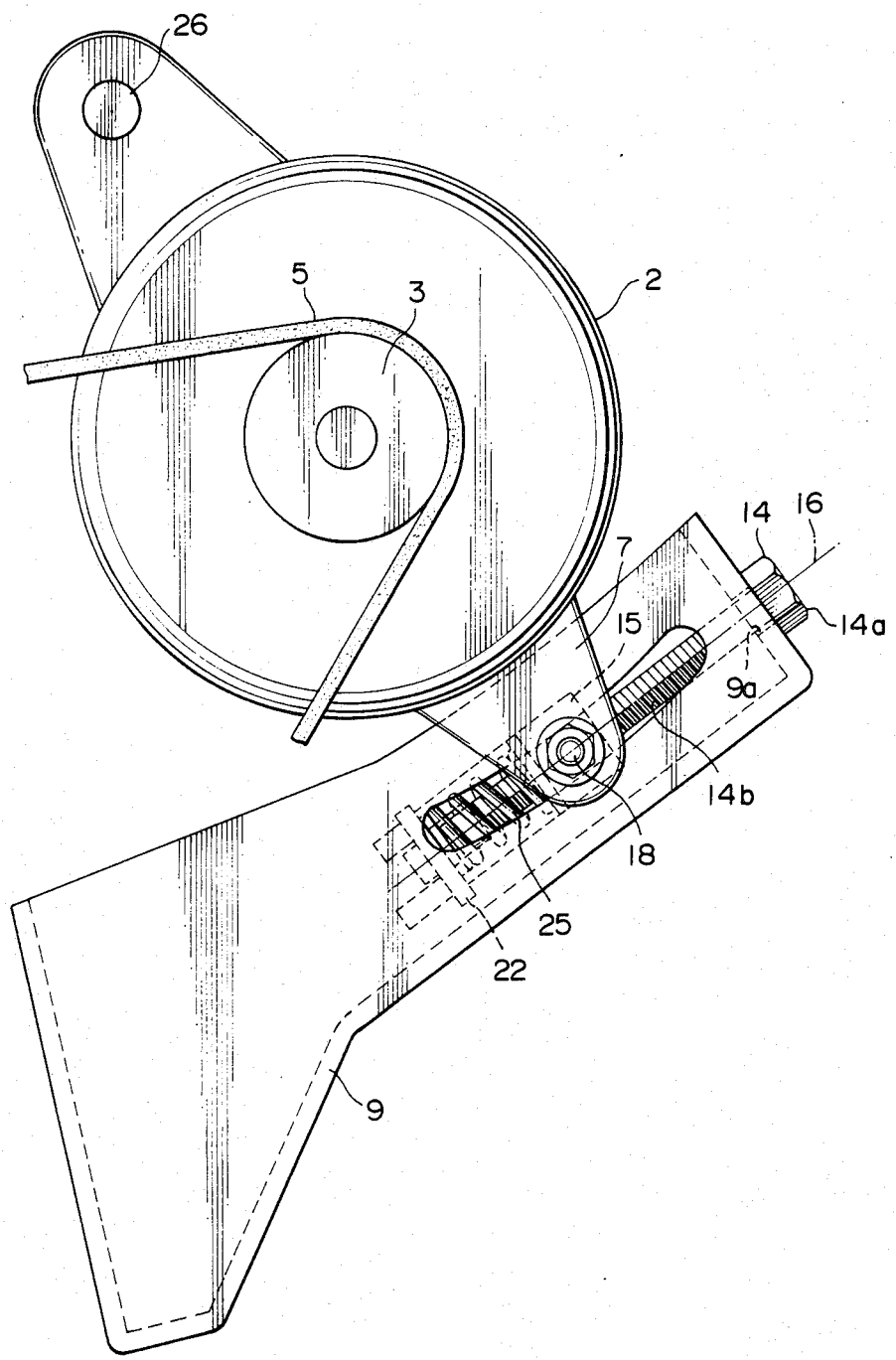
FIG. 1 is an elevational view of a V-belt stretching mechanism of the present invention.
Figure 10:
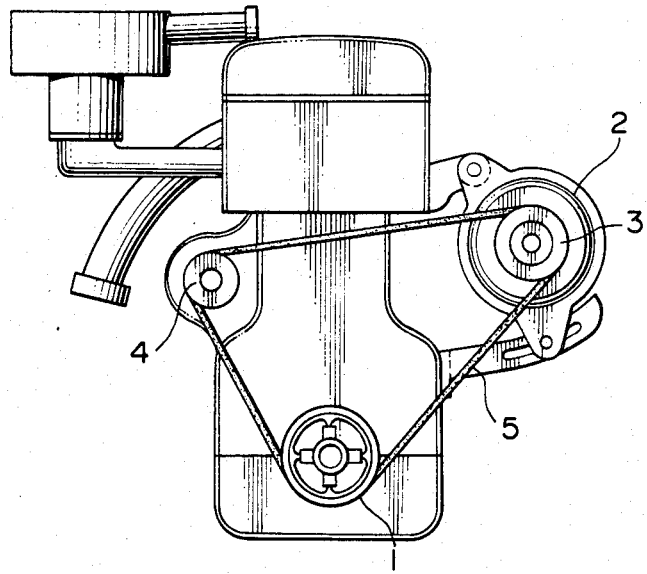
FIG. 10 is an elevational view showing the state of the V-belt wound in the conventional engine.
Figure 11:
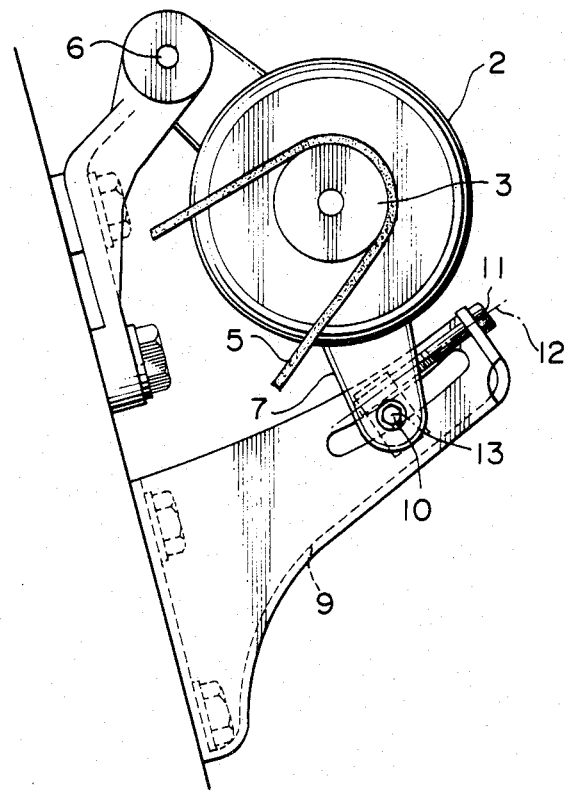
FIG. 11 is an elevational view of the vicinity of the alternator in FIG. 10.
Figure 12:
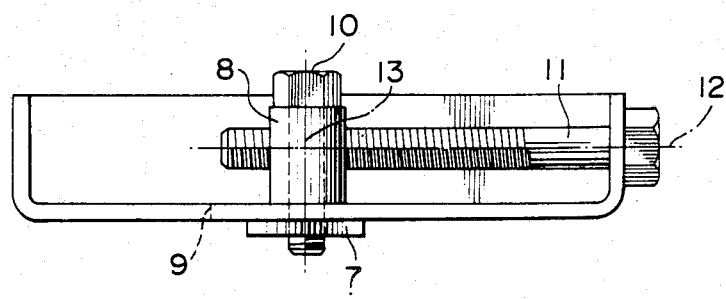
FIG. 12 is a plan view showing the device in FIG. 11.

FIGS. 1 to 8 illustrate a preferred embodiment of the present invention. In FIG. 1, belt 5, which may be a V-belt wraps around pulley 3 of alternator 2. The position of alternator 2 is adjusted by adjust bar 9 moving alternator stay 7. The construction so far is the same or equivalent to the conventional construction illustrated in FIGS. 10 to 12.

Figure 2:
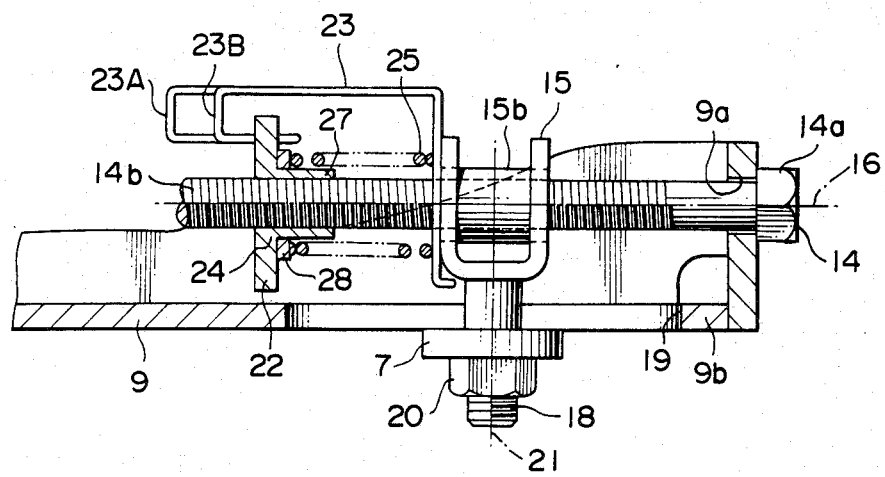
FIG. 2 is an elevational view of the vicinity of the adjust bar in the mechanism illustrated in FIG. 1.

As indicated in FIGS. 1 and 2, adjust bolt 14 passes through bolt hole 9a formed in adjust bar 9, with its head 14a contact-engaged with adjust bar 9 and its threaded part 14b extending toward the engine cylinder block. Slider 15 is fastened by stay-fastening bolt 18 to adjust bar 9 together with alternator stay 7. Nut 27 is a unit separate from slider 15 and is threaded onto adjust bolt 14.

As illustrated in FIGS. 2 through 5, slider 15 is shaped like a U 15a, that is, U-shaped and includes cylindrical pipe 15b extending between a pair of legs of said U. Adjust bolt 14 slidably extends through pipe 15b. Therefore, axis 16 of adjust bolt 14 is coincident with axis 17 of pipe 15b.

On the side connecting the pair of legs of slider 15 stay-fastening bolt 18 extends outside said U of slider 15 at a right angle with respect to adjust bolt 14.

Guide-hole 19 is formed in wall 9b, parallel to adjust bolt 14, of adjust bar 9. Guide-hole 19 is elongated in the longitudinal direction of adjust bolt 14 and curved with an arc whose center is on center 26 of the swinging motion of stay 7.

Stay-fastening bolt 18 extends through guide hole 19 in adjust bar 9. Lock nut 20 is threaded onto stay-fastening bolt 18 on the opposite side of slider 15 with respect to wall 9b of adjust bar 9 in which guide hole 19 is formed. Stay 7 is disposed between wall 9b of adjust bar 9 and lock nut 20, and is fastened to adjust bar 9 together with slider 15 by lock nut 20 when lock nut 20 is turned in the fastening direction.

Axis 21 of stay-fastening bolt 18 intersects with axis 16 of adjust bolt 14 at a right angle. Therefore, axis 21 of stay-fastening bolt 18 and axis 16 of adjust bolt 14 are in the same plane.

Figure 6:
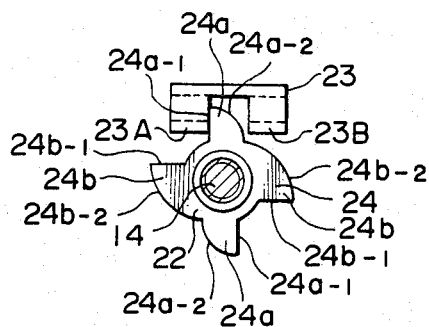
FIG. 6 is a side view showing the cam and the spring plate in FIG. 1.
Figure 7:
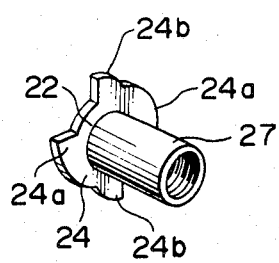
FIG. 7 is a perspective view showing the nut and the slide cam in FIG. 1.

As indicated in FIGS. 2 and 7, nut 27 extends in the axial direction of adjust bolt 14, opposite to head 14a of adjust bolt 14. Nut 27 terminates as a slide cam 22 with a hook 24 radially protruding. As indicated in FIG. 6, hook 24 is equipped with saw-teeth 24a and 24b which are opposed to each other in the rotating direction and located alternately in the circumferential direction. Outside surfaces 24a-2 and 24b-2 of saw teeth 24a and 24b, which smoothly decrease in diameter, are shaped such that when step 24a-1 or 24b-1 of these teeth engage one arm 23A of spring plate 23, outside surface 24a-2 or 24b-2 does not contact the other arm 23B.

When adjust bolt 14 is tightened, nut 27 and slide cam 22 will move toward head 14a of adjust bolt 14, that is, in the direction of bringing slide cam 22 close to slider 15. When adjust bolt 14 is loosened, nut 27 and slide cam 22 will move in the opposite direction, moving slide cam 22 away from slider 15. Between slider 15 and slide cam 22 there is interposed a compressive spring 25, which urges slider 15 away from slide cam 22 toward head 14a of adjust bolt 14.

A nylon washer 28 may be provided at least at one end of the spring 25 to allow for smooth rotation.

Figure 3:
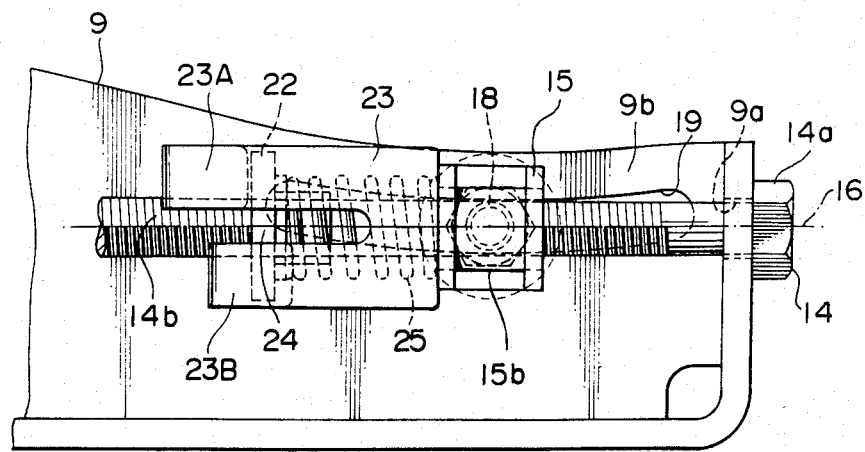
FIG. 3 is a plan view of the vicinity of the adjust bar in the mechanism of FIG. 1.
Figure 4:
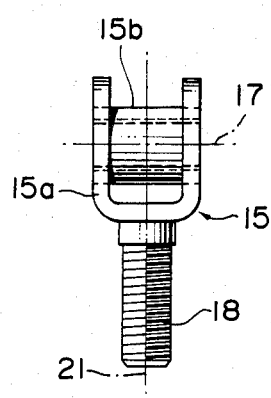
FIG. 4 is an elevational view showing the slider and the stay-fastening bolt in FIG. 1.
Figure 5:
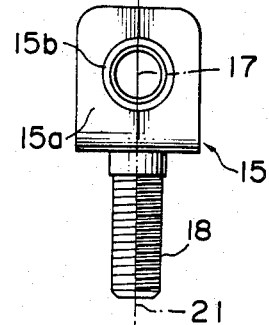
FIG. 5 is a side view showing the slider and the stay-fastening bolt in FIG. 1.
Figure 8:
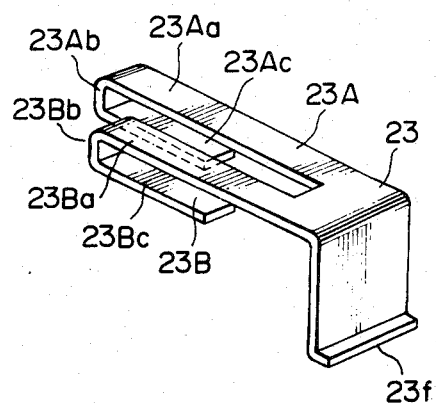
FIG. 8 is a perspective view showing the spring plate in FIG. 1.

As indicated in FIGS. 2, 3, 6 and 8, slider 15 has a spring plate 23. Spring plate 23 carries a pair of arms 23A and 23B which extend from slider 15 above nut 27 away from adjust bolt head 14a. Arms 23A and 23B branch off midway and extend parallel to nut 27 at right and left positions above the axis of nut 27. Arms 23A and 23B consist of first parts 23Aa and 23Ba which extend parallel to nut 27, second parts 23Ab and 23Bb which turn from first parts 23Aa and 23Ba and extend downward, and third parts 23Ac and 23Bc which extend toward adjust bolt head 14a. As indicated in FIGS. 3 and 8, the ends of third parts 23Ac and 23Bc toward adjust bolt head 14a are staggered from each other in the longitudinal direction of nut 27. Third part 23Ac of arm 23A extends to a point less close to adjust bolt head 14a than third part 23Bc of arm 23B. Second part 23Ab of arm 23A is located farther from adjust bolt head 14a than second part 23Bb of arm 23B. Spring plate 23 extends downward following the side surface of slider 15 on the side of slide cam 22, bends to the under side of slider 15 at the bottom of slider 15 and terminates at 23f (See FIGS. 2 and 8). Portion 23f contacts the bottom of slider 15.

When adjust bolt 14 is tightened a little, spring plate 23 engages hook 24 of slide cam 22. However, the lengths and locations of arms 23A and 23B of spring plate 23 are selected such that, when adjust bolt 14 is tightened to a greater extent and as a consequence slide cam 22 comes closer to adjust bolt head 14a, engagement is lost between hook 24 and third part 23Ac of arm 23A of spring plate 23.

As adjust bolt 14 is loosened, slide cam 22 moves farther away from adjust bolt head 14a, and as a consequence, engagement is lost between hook 24 and third part 23Bc of arm 23B of spring plate 23. The ends of arms 23A and 23B are made staggered so that, even if the engagement with one arm 23A or 23B is lost with rotation of adjust bolt 14 in one direction, the engagement of hook 24 with another arm 23B or 23A is maintained with rotation of adjust bolt 14 in the opposite direction, thereby, making it possible to turn nut 27 in either the tightening direction or the loosening direction between two extreme positions.

Next the function of the mechanism in the above arrangement of the preferred embodiment will be explained.

When V-belt 5 is to be stretched, at first stay-fastening bolt 18 is loosened to make slider 15 movable with respect to adjust bar 9. Then adjust bolt 14 is tightened. Since the rotation of nut 27 is arrested through engagement between step 24a-1 of hook 24 of slide cam 22 and the third part 23Ac of arm 23A of spring plate 23, hook 24a slides between arms 23A and 23B and as a consequence nut 27 and slide cam 22 are moved in the direction of adjust bolt head 14a, thereby shifting slider 15 toward adjust bolt head 14a via spring 25. In this way V-belt 5 is stretched.

As the tension of V-belt 5 comes closer to the specified value, the shift of slider 15 decreases under the load of the V-belt 5 and, with the deflection of spring 25 increased, slide cam 22 slides along spring plate 23. When engagement is lost between step 24a-1 of hook 24 and third part 23Ac of arm 23A of spring plate 23, slide cam 22 and nut 27 begin to make an integrated rotation. Then even if adjust bolt 14 in further tightened, nut 27 slips in rotation and the tension of V-belt 5 increases no more. The strength of spring 25 is set such that this tension can be the specified tension of V-belt 5 and thus V-belt 5 can be automatically stretched to a specified tension. This technique for setting the tension requires no tension gauge and accordingly it is easy.

When V-belt 5 is to be loosened, adjust bolt 14 is turned in an opposite direction. Step 24b-1 of hook 24 of slide cam 22, which turns together with nut 27, engages third part 23Bc of arm 23B of spring plate 23 and thus the rotation is locked. As a result, hook 24 slides between arms 23A and 23B of spring plate 23 in the direction away from slider 15. As a result, spring 25 is elongated and the force of spring 25 biasing slider 15 decreases, thereby lessening the tension on V-belt 5. Eventually, loosening adjust bolt 14 causes step 24b-1 of hook 24 to disengage from third part 23Bc of arm 23B and nut 27 begins to slip in rotation, preventing further decrease in the tension of V-belt 5.

If adjust bolt 14 is again turned in the direction of tightening V-belt 5, V-belt 5 can be again stretched.

This method of setting the tension of V-belt 5 is available not only for automatic stretching of V-belt 5 but also for automatic prevention of excessive looseness of V-belt 5, since the positions of both ends of arms 23A and 23B, in the longitudinal direction of nut 27 are staggered from each other.

Further, since the external shape of hook 24 is a saw tooth, smooth curved surfaces 24a-2 and 24b-2 are not in contact with arms 23A and 23B when steps 24a-1 and 24b-1 are in contact with arms 23A and 23B. Accordingly, with a small frictional resistance to sliding, V-belt 5 can be stretched with a light force to a specified tension.

In tensioning V-belt 5, the load from V-belt 5 is transmitted via alternator pulley 3, alternator stay 7 and stay-fastening bolt 18 to slider 15. The tightening force caused by the rotation of adjust bolt 14, which acts in the longitudical direction of adjust bolt 14, is transmitted via slide cam 22 and spring 25 to slider 15. Since the axis 16 of adjust bolt 14 and the axis 21 of stay-fastening bolt 18 are in the same plane, the load transmitted to slider 15 from V-belt 5 and the tightening force transmitted to slider 15 from adjust bolt 14 are in the same plane, causing no moment. Therefore, no moment is loaded on slider 15 and no bending moment is loaded on adjust bolt 14. As a result, inclination of slider 15 due to any moment is prevented and inclination of adjust bolt head 14a with respect to adjust bar 9 is also prevented. This prevention of inclination of slider 15 and adjust bolt head 14a makes rotation of adjust bolt 14 smooth and makes it possible to turn adjust bolt 14 with a light force, so that smooth and exact adjustment of tension in V-belt 5 is ensured.

Figure 9:
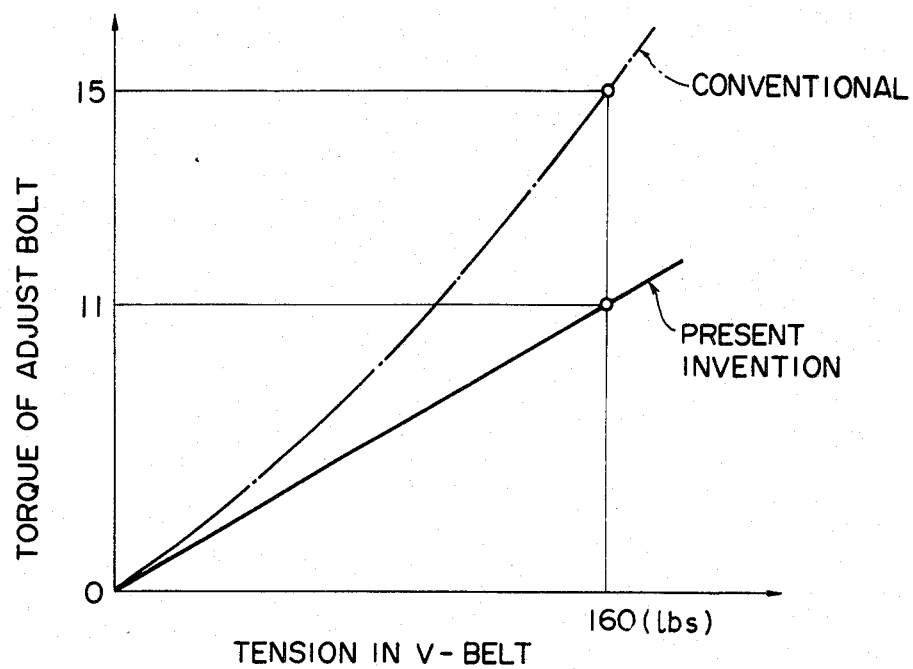
FIG. 9 is a graph showing the relationship between the tension of the belt and the tightening torque of the adjust bolt both in the present invention and in the conventional mechanism

FIG. 9 shows the relationship between the tension in the V-belt and the tightening torque of the adjust bolt, for the above embodiment of the present invention and for a conventional belt stretching mechanism in which the the axis of the stay-fastening bolt is off-set by 14 mm from the axis of the adjust bolt. As shown in FIG. 9, 11 Kg-cm of torque is needed to obtain 160 lbs of tension in the V-belt according to the present invention, while 15 Kg-cm of torque is needed to obtain the same tension in the V-belt according to the conventional belt stretching mechanism.

Although only one preferred embodiment of the present invention has been described in detail, it will be appreciated by those skilled in the art that various modifications and alterations can be made to the preferred embodiment shown without materially departing from the novel teachings and advantages of this invention. Accordingly, it is to be understood that all such modifications and alterations are included within the scope of the invention as defined by the following claims.

What is claimed is:

1. A belt stretching mechanism to adjust the tension of a belt wound around pulleys, the position of one of said pulleys being adjustable by moving a stay, comprising:

an adjust bar with an elongated guide-hole extending in an arc along an axis;

an adjust bolt whose head contact-engages said adjust bar, said contact-engagement supporting said adjust bolt, the end of said adjust bolt opposite said head being freely moveable with respect to said adjust bar;

a slider through which said adjust bolt slidably extends;

a nut extending in the longitudinal direction of said adjust bolt and threaded onto said adjust bolt;

a slide cam formed at the end of said nut;

a spring interposed between said slider and said slide cam and urging said slider toward said head of said adjust bolt;

a spring plate extending from said slider parallel to the axis of said adjust bolt and being slidably engageable with said slide cam until a predetermined force is placed on said spring; and stay-fastening bolt means, attached to said slider and extending through said guide hole of said adjust bar for fastening said stay together with said slider to said adjust bar, the axis of said stay-fastening bolt means and the axis of said adjust bolt passing through a point along said axis of said guide-hole, said adjust bolt, adjust bar, nut and stay-fastening bolt means being arranged to place said adjust bolt under tension as said adjust bolt is turned to stretch said belt, the axis of said adjust bolt extending substantially tangential to said axis of said elongated guide-hole when said spring is under said predetermined force.

2. The belt stretching mechanism of claim 1, wherein said guide-hole is arc whose center is on the center of swinging motion of said stay.

3. The belt stretching mechanism of claim 1, wherein said slider includes of a U-shaped member and a pipe extending between a pair of legs of said U, said adjust bolt slidably extending through said pipe.

4. The belt stretching mechanism of claim 1, wherein said slider includes a U-shaped member having a pair of legs and a portion connecting said legs, said stay-fastening bolt means being fixed to said connecting portion and extend outside said U at a right angle with respect to said adjust bolt.

5. The belt stretching mechanism of claim 4, wherein said stay-fastening bolt means includes a bolt attached to said connecting portion and a lock nut threaded onto said bolt, said stay being fastened between said adjust bar and said lock nut on said bolt when said lock nut is turned in the fastening direction.

6. The belt stretching mechanism of claim 1, wherein:
said slide cam has a hook with staggered saw teeth; and
said spring plate has a pair of arms, each arm having a first part which extends away from said head of said adjust bolt at opposite sides above said adjust bolt, a second part which extends downward from said first part, and a third part which extends toward said head of said adjust bolt from said second part and is disposed to engage with said hook, said second parts of said arms being staggered from each other in the longitudinal direction of said adjust bolt, the ends of said third parts toward said head of said adjust bolt being staggered from each other in the longitudinal direction of said adjust bolt.

7. The belt stretching mechanism of claim 6, wherein said third part of one of said arms engages said hook when said adjust bolt is turned to tighten the belt, said third part of said one arm ending a greater distance from said head of said adjust bolt than the end of said third part of the other of said arms.

8. The belt stretching mechanism of claim 6, wherein said second part of one of said arms whch engages said hook when said adjust bolt is turned to tighten the belt is located farther from said head of said adjust bolt than said second part of the other of said arms.

9. The belt stretching mechanism of claim 1, wherein said spring plate extends downward following the end surface of said slider on the side of said slide cam, bends at the bottom end of said slider toward the underside of said slider, and engages the bottom end of said slider at the bent part.

10. The belt stretching mechanism of claim 1, wherein said stay is an alternator stay, said alternator stay being fixed to an alternator and extending downward from said alternator.

* * * * *